(12) United States Patent
Degnan

(10) Patent No.: US 6,343,245 B1
(45) Date of Patent: Jan. 29, 2002

(54) MICROALTIMETER

(75) Inventor: John J Degnan, Annapolis, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/544,169

(22) Filed: Apr. 6, 2000

Related U.S. Application Data

(60) Provisional application No. 60/129,232, filed on Apr. 14, 1999.

(51) Int. Cl.[7] .................................................. H01J 40/14
(52) U.S. Cl. .......................... 701/4; 701/223; 244/164; 244/171
(58) Field of Search ................................ 701/4, 223, 3; 356/336, 337; 250/208.1; 244/164, 171

(56) References Cited

U.S. PATENT DOCUMENTS 6,028,300 A * 2/2000 Rhoads et al. .............. 250/208

* cited by examiner

Primary Examiner—William A. Cuchlinski, Jr.
Assistant Examiner—Arthur D. Donnelly

(57) ABSTRACT

A microaltimeter measures altitude or range highly accurately from an orbiting vehicle. The microaltimeter has a low power solid state laser that is pulsed at a rate above 1 kilohertz. The pulses are delivered to a small telescope which sends them to a planetary surface and receives return reflections. A high efficiency photon detector measures received photons and supplies received photon signals to a process or which makes a time-based bin-wise comparison to find the time of flight and hence the range.

7 Claims, 2 Drawing Sheets

MICROALTIMETER

CROSS REFERENCE TO RELATED APPLICATION

Priority is claimed from copending U.S. provisional application No. 60/129,232, filed Apr.14, 1999.

ORIGIN OF INVENTION

The invention described herein was made by an employee of the United States Government, and may be manufactured and used by or for the Government for governmental purposes without the payment of any royalties thereon or therefore.

FIELD OF THE INVENTION

The invention relates generally to laser altimeters and in particular to space-borne laser altimeters for mapping planetary surfaces and the like.

BACKGROUND OF THE INVENTION

Spaceborne laser altimeters typically use modest energy 50 to 100 milliJoules solid state lasers, large telescopes having apertures of 50 to 100 centimeters in diameter, and high detection thresholds to achieve unambiguous surface returns with few or no false alarm resulting from solar background noise. As a result of this conventional design philosophy, spacecraft prime power and weight constrains typically restrict operations to modest repetition rates on the order of a few tens of Hz which, at a typical earth orbit round velocity of seven kilometers per second limits along-track spatial sampling to one sample every few hundred meters. There is great motivation in obtaining higher along-track resolution and/or better cross-track coverage, but achieving this capability through a simple scaling of the laser fire rate or power is not practical from spacecraft. This is especially true of altimeters for use in orbit about other planets where instrument mass and prime power usage is severely restricted. In ground-based systems the conventional high signals-to-noise ratio approach to laser altimetry does not make efficient use of the available laser photons.

The surface return rate of an Earth orbiting altimeter can be increased by the two orders of magnitude for a given laser output power by emitting the available photons in a high frequency (few kilohertz) train of low energy, approximately one milliJoules pulses as opposed to a low frequency train of high energy pulses by employing single photon detection. This mode of operations reduces the risk of internal optical damage to the laser, thereby improving long-term reliability and makes the beam inherently more eyesafe to a ground-based observer. In addition these high return rates can be accomplished with much smaller telescope apertures on the order of 10 centimeters diameter. Indeed the contrast of the terrain signal against the solar-induced noise background is actually enhanced through the use of a small receive telescope.

However a problem with such a ground-based system is that it relies on the accuracy smoothness or reliability of a satellite track. Such a system is unsuitable for use in an orbiting altimeter for providing high resolution of rapid terrain changes across steep slopes. The ground-based system in part obtains its relatively large signal-to-noise ratio by means of the predictability of the orbital motion or velocity of displacement from the satellite to the receiving head along the path of the laser beam.

What is needed then is an improved microaltimeter system for use in spacecraft and in particular in deep space probes. The system should use relatively low power but which provide very high resolution of terrain, atmospheric, oceanic features and the like.

SUMMARY OF THE INVENTION

Apparatus embodying the present invention includes a microlaser associated with a small diameter telescope. The microlaser emits pulses of coherent light at a high repetition rate. The emitted laser pulses are collimated by the telescope and transmitted to a ground track. Photons are reflected off the ground. The return photons are filtered through a spectral filter and through a spacial filter to reduce solar background noise. The telescope then receives the return photons and supplies them to a multi-pixel or a multi-faceted single photon detection system.

The use of relatively simple software algorithons based on post-detection Poisson filtering techniques enables the identification and extraction of surface sampling data from the more abundant optical background noise prior to on-board storage or transmission of a data to the ground station.

The roughly order of magnitude reduction in required telescope diameter greatly simplifies the mechanics of scanned system and allows the use of relatively inexpensive, modest diameter optical wedges or holographic optical elements to simultaneously scan boet the transit and receive beams for-cross-track interrogation of the terrain while maintaining narrow fields of view for background noise suppression.

By using state of the art photon counting detectors, which are capable of providing centimeter level ranging resolution, as well as angularly resolving the source of a single photon event within the receiver field-of-view performance is further enhanced. With high angular resolution of the single photon source the measured range becomes nearly a point-to-point measurement. That is from an internal altimeter reference point to a small area of uncertainty on the surface. This is determined by the angular resolving power of the photodetector and can be very small compared to the total beam area on the ground. The ranging precision then is limited by the laser pulsewidth, the timing capabilities of the range receiver, and the much-reduced residual spreading caused by the roughness of the surface and slope within the very small zone of range uncertainty. This ability to measure the near point-to-point-time-of-light of an individual photon, together with the high effective signal to noise the ratio, avoids much of the range ambiguity inherent in current high energy altimeters. Such systems will require multiple photons reflected from anywhere within illuminated spot to be recorded by waveform digitizers which consume relatively large amounts of power. The signals would then have to be deconvoluted using sophisticated and not completely reliable algorithms in order to decipher the results and obtain a single range measurement.

The apparatus and method embodying the present invention will provide significantly greater spatial resolution in either the along-track or cross-track directions or both, as well as greatly reduced demands on spacecraft resources such as prime power, volume and weight allocations. Potential altimeter targets are land, ice, and water surfaces as well as distributed or soft targets such as clouds, planetary boundary layers, tree canopies and other vegetation. The much-reduced signal levels of the microaltimeter embodying the present invention relative to conventional altimeters are largely offset by a corresponding reduction in the detection thresholds to one photoelectron or less so that instrument sensitivity is enhanced. As a result geoscience applications including development of high resolution, high accuracy topographic databases of land surfaces useful for studying hydrogical runoff, the effects of clouds on radiation balance, changes in sea, lake, or reservoir levels, changes in ice sheet thickness, tree canopy heights and biomass assessment are all possible through use of the apparatus and method embodying the present invention. Applications to extraterrestrial science missions including low power high resolution topographic mapping of other planets, moon, asteroids and comets within the Solar Systems may also be carried out through he apparatus and method of this invention. The apparatus and method of this invention may also be used for aerial surveying of cities and towns and/or generating of local topographic maps from high aircraft cruise altitudes which do not require special Federal Aviation Administration waiver.

It is a principal aspect of the present invention to provide an apparatus and method for low power, highly accurate ranging detection from a high altitude aircraft or an orbiting spacecraft or the like.

Other aspects of the invention will become obvious to one of ordinary skill in the art upon a perusal of the following specification and claims in light of the accompanying and drawings.

DETAILED DESCRIPTION OF THE INVENTION

Figure 1:
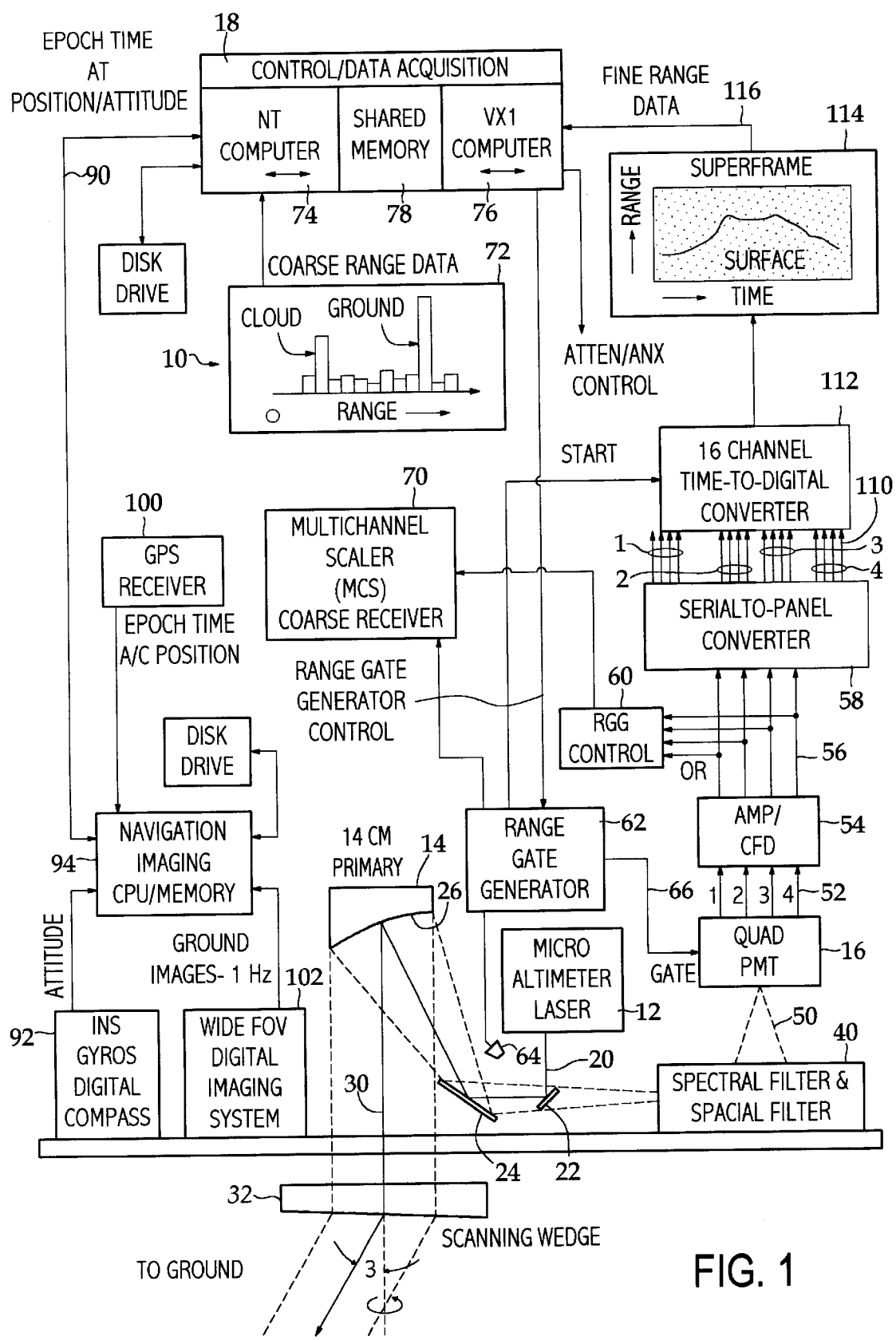
FIG. 1 is a block diagram of a apparatus embodying the present invention.
Figure 2:
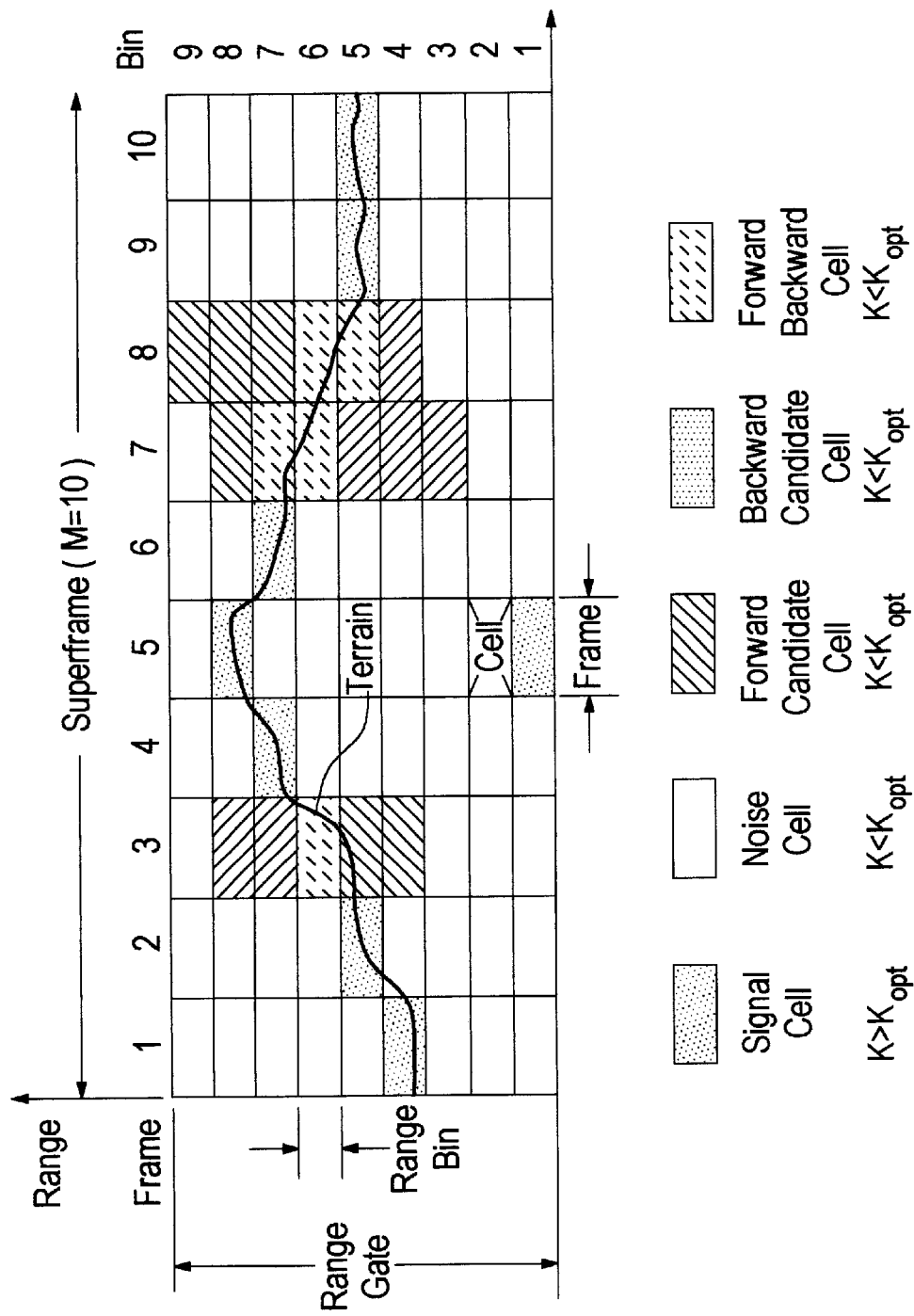
FIG. 2 is a graph showing details of a signal processing technique embodying the present invention

Referring now to the drawings and especially to FIG. 1, an apparatus embodying the present invention is shown therein and generally referred to by reference numeral 10. The apparatus 10 comprises in this embodiment, a microaltimeter 10. The microaltimeter 10 includes a source of coherent, substantially monochromatic light 12. Coherent light source 12 is a solid state microlaser 12. The microlaser 12 is a pulsed Q-switch solid state laser which emits light at a wavelength of 532 nanometers in pulses having a duration of less than one nanosecond to provide high spatial resolution. The laser is pumped from a light source through a fiber optic link and an appropriate collimating lens which supplies light to the gain material comprising the laser. The laser emits the pulses at a rate of about 10 kilohertz, each pulse being 50 to 100 milliJoules in energy. The pulses are sent to a telescope 14 which then collimates the laser light, sends it the ground and receives reflected laser photons back. The reflected photons are then fed to a photon time-of-flight detector 16 which is connected to a processor 18 which draws conclusions as to the range data.

In further detail, the microaltimeter laser 12 is a Nd:YAG laser. The laser 12 emits a beam 20 which is received by a mirror 22, forwarding beam to a second mirror 24 which ultimately sends the light to the concave off-axis paraboloidal mirror 26 of the telescope 14. The paraboloidal mirror then launches a collimated pulse beam 30 which may be sent through a optical scanning wedge 32 to a surface. The beam then returns along substantially the same beam path, is received back at the primary mirror 26, fed to the mirror 24 and a portion of the beam is fed to a spectral and spatial filter 40. That filter comprises a 140 microradian spatial filter for removing extranians solar background photons as well as a 3 nanometer bands pass spectral filter centered around the frequency of the laser light for removing further solar background photons which will further reduce the signal-to-noise ratio of the detector. The resulting filter and light is sent in a stream 50 to a quad photomultiplier tube that is a photomultiplier tube assembly having four areas which are able to provide some ground resolution.

The quad photomultiplier tube is sufficiently sensitive that it can produce output signals for each of the photons it receives thereby acting as a photon time of flight detector. The four elements of the quad photomultiplier tube feed separate signals on a four line photomultiplier bus 52 to an amplifier set 54. Then amplifies set then provides and amplified light detector output on amplifier bus lines 56 to a serial-to-parallel converter 58 and to a range gate generator control on or gate 60.

A range gate generator 62 has a detector 64 which starts a timing sequence running and supplies a gate signal over a line 66 to the quad photomultiplier tube indicating whenever a laser pulse has been launched. The range gate generator 62 also sends a signal to a multichannel scalar or coarse receiver 70 which receives an output from the generalized output from a range gate control 60 from the amplifier set 54. The multichannel scalar 70 provides coarse range data which is binned in the manner shown in 72 and then fed to the control and data acquisition system 18.

That system includes a Windows NT based computer 74, a VXI or fine range data processing computer 76 and a shared memory 78 for processing the information. In addition the NT computer receives time and position data through a line 90 from other portions of the system including an inertial navigation system, and gyroscopic compass 92 which may include a laser gyro system or the like which sends attitude information to a navigation imaging CPU and memory or processor system 94. That system in term is able to communicate the epoch data to the anti computer. It also receives signals from a global positioning system receiver 100 located on the satellite or aircraft and from a wide field-of-view digital imaging system 102. The system is able to process the information and store data on the disk drive and draw conclusions as to the rough instantaneous position of the vehicle in order to further find the range data.

The output amplified signals from the photomultiplier tubes are fed through the serial to parallel converter over a plurality of four buses 110 to a 16 channel time-to-digital converter 112 which provides detailed or fine range data of the type shown in 114 via a bus 116 to the VXI computer 76. The VXI computer 76 is then programmed to provide binning operations of the range data.

The start pulse and one or more stop pulses will be recorded for each laser fire by the course and fine receivers 70 and 112. They operate as correlation range receivers but with quite different range gates and resolution post detection filtering will identify which cells or tinning bins in the range gates of the output of the course and fine receivers are most likely to contain signal counts. The photon time of flight signals are then subtracted from aircraft or spacecraft altitude and corrected for pitch, roll, and yaw all of which is received by the line 90 at the control and data acquisition computers 18. The final data analysis product will be a three dimensional plot of the terrain for a scanned swath of approximately 500 meters or less beneath the flight path. With the use of laser pulse energy of 10 microJoules and a 14 centimeter telescope aperture a mean signal strength of about 1.5 photoelectrons per laser pulse from a surface with low reflectance, on the order of 0.1 and a mean slope of 45° results. In this type of system that would result in a 76 percent probability of detection for the reference slope that would approach 100 percent for level terrain.

The correlation range receiver identifies the signal cell by summing the counts in each cell and comparing the total to a frame threshold value which has been previously chosen using poisson statistics. When the count exceeds the threshold the cell is tentatively identified as containing a signal indicating that a laser photon has been received. Otherwise, it is tentatively identified as containing noise. In the event that adjacent cells are unable to be determined to have signals, an N of M test will be applied to the data requiring that in N of M succesive frames making up a superframe one of the cells passes the threshold test and is displaced from signal cells and adjacent frames by no more than one range bin in vertical range.

In addition more sophisticated tracking algorithms which make examinations forward and backward along the time axis of the bins are also possible and could further accommodate steep or rapidly changing terrain features. For example, looking forward using adjacent range bin criteria and then working backward can lead to the identification of a middle cell which contains most of the reflected signal.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. Apparatus for measuring accurately the altitude of an aircraft or a spacecraft, comprising:

a low power source of pulse coherent light;

a telescope that receives the pulses of light and collimates them prior to emission;

a high efficiency photon detector emitting detection signals responsive to the number of reflected photons received from a surface; and, a processor system responsive to signals from a high efficiency photon detector and producing a ranging signal in response thereto, by storing successive signals in range basis and verifying the return time of flight of photon when adjacent beam values are in a predetermined relationship wherein said processor system determines whether the contents of the adjacent basis are similar.

2. A microaltimeter for measuring accurately the altitude of an aircraft or a spacecraft according to claim 1 wherein said source of light in a low power loses emitter pulses at a rate greater than one kilohertz.

3. Apparatus according to claim 1 wherein said laser is a Q-switched solid state laser producing visible light pulses having a duration of less than one monosecond.

4. Apparatus according to claim 1 wherein said telescope is a small diameter telescope which provides a nominal laser photon to solar background signal-to-noise ratio of less than one.

5. Apparatus according to claim 1 wherein the high efficiency photon detector produces output signals in response to each photon received to provide a photon time of flight signal.

6. Apparatus according to claim 1 further composing a spatial filter for removing off-axis photons from a received photon stream.

7. Apparatus according to claim 1 function comprising a spatial filter for removing a portion of the solar background photons received by the telescope.

* * * * *